(12) United States Patent
Matthews et al.

(10) Patent No.: US 8,355,328 B2
(45) Date of Patent: Jan. 15, 2013

(54) DYNAMIC LOAD BALANCING

(75) Inventors: Brad Matthews, San Jose, CA (US);
Bruce Kwan, Sunnyvale, CA (US);
Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 255 days.

(21) Appl. No.: 12/780,493

(22) Filed: May 14, 2010

(65) Prior Publication Data

US 2011/0051602 A1  Mar. 3, 2011

Related U.S. Application Data

(60) Provisional application No. 61/237,661, filed on Aug. 27, 2009.

(51) Int. Cl.
*H04L 12/26* (2006.01)

(52) U.S. Cl. .................. 370/235; 370/389; 370/395.3

(58) Field of Classification Search .................. 370/389, 370/351, 358, 391, 399, 397, 395.21, 395.31, 370/395.41, 400, 411, 235, 395.5
See application file for complete search history.

(56) References Cited

U.S. PATENT DOCUMENTS

| | | | |
|---|---|---|---|
| 6,147,970 A | 11/2000 | Troxel | |
| 6,188,698 B1 | 2/2001 | Galand et al. | |
| 6,198,723 B1 | 3/2001 | Parruck et al. | |
| 6,470,025 B1 | 10/2002 | Wilson et al. | |
| 6,788,697 B1 | 9/2004 | Aweya et al. | |
| 6,914,882 B2 | 7/2005 | Merani et al. | |
| 6,961,307 B1 | 11/2005 | Aweya et al. | |
| 7,027,457 B1 | 4/2006 | Chiussi et al. | |
| 7,289,514 B2 | 10/2007 | Robotham et al. | |
| 7,305,492 B2 | 12/2007 | Bryers et al. | |
| 7,359,328 B1 | 4/2008 | Allan | |
| 7,483,374 B2 * | 1/2009 | Nilakantan et al. | 370/235 |
| 7,545,740 B2 | 6/2009 | Zelig et al. | |
| 7,577,096 B2 | 8/2009 | Smith et al. | |
| 7,724,661 B2 | 5/2010 | Burns | |
| 7,724,663 B2 | 5/2010 | Arefi et al. | |
| 7,813,271 B2 | 10/2010 | Fourcand | |
| 7,839,850 B2 | 11/2010 | Kompella | |
| 7,957,284 B2 | 6/2011 | Lu et al. | |
| 7,974,202 B2 | 7/2011 | Solomon | |
| 8,014,394 B2 | 9/2011 | Ram et al. | |
| 8,027,256 B1 | 9/2011 | Subramanian et al. | |
| 8,068,416 B2 | 11/2011 | Hu et al. | |
| 2003/0161311 A1 | 8/2003 | Hiironniemi | |
| 2005/0058069 A1 * | 3/2005 | Dauchy et al. | 370/230 |

(Continued)

OTHER PUBLICATIONS

Office Action received for U.S. Appl. No. 12/780,524, mailed on Feb. 23, 2012, 25 pages.

*Primary Examiner* — Brenda H Pham
(74) *Attorney, Agent, or Firm* — Brake Hughes Bellermann LLP

(57) ABSTRACT

Methods and apparatus for dynamic load balancing are disclosed. An example method includes receiving, at a network device, a data packet to be sent via an aggregation group, where the aggregation group comprising a plurality of aggregate members. The example method further includes determining, based on the data packet, a flow identifier of a flow to which the data packet belongs and determining a state of the flow. The example method also includes determining, based on the flow identifier and the state of the flow, an assigned member of the plurality of aggregate members for the flow and communicating the packet via the assigned member.

18 Claims, 15 Drawing Sheets

U.S. PATENT DOCUMENTS

2008/0291882 A1 11/2008 Martinotti et al.
2008/0298236 A1 12/2008 Ervin et al.
2011/0051603 A1 3/2011 Matthews et al.
2011/0051735 A1 3/2011 Matthews et al.
2011/0090789 A1 4/2011 Fung

* cited by examiner

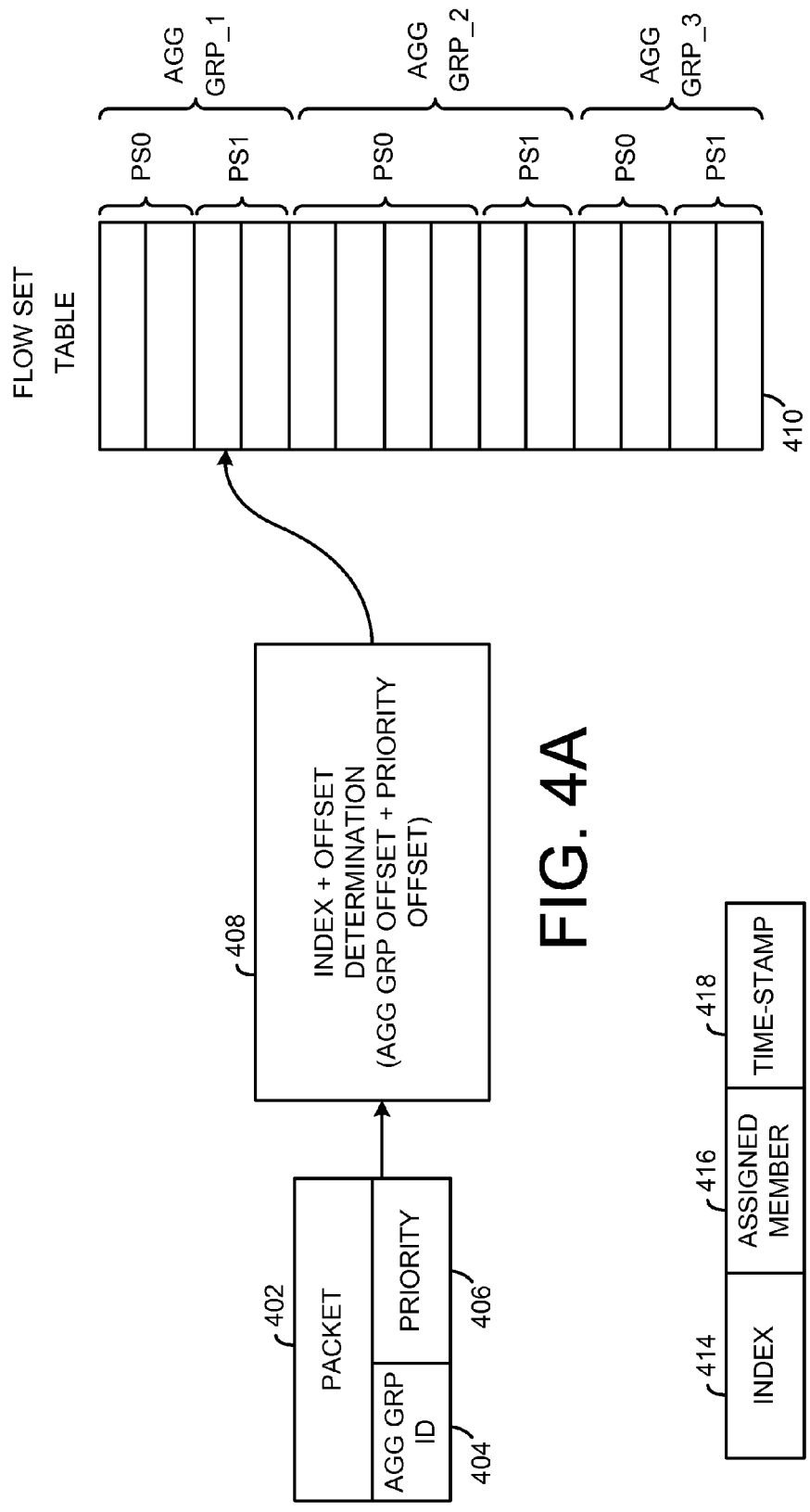

| PORT LOADING THRESHOLD (kB) | QUANTIZATION |
|---|---|
| 100 | 000 |
| 200 | 001 |
| 300 | 010 |
| 400 | 011 |
| 500 | 100 |
| 600 | 101 |
| 700 | 110 |
| >700 | 111 |

| QUEUE SIZE THRESHOLD (CELLS OR PACKETS) | QUANTIZATION |
|---|---|
| 100 | 000 |
| 200 | 001 |
| 500 | 010 |
| 1000 | 011 |
| 2000 | 100 |
| 5000 | 101 |
| 10000 | 110 |
| >10000 | 111 |

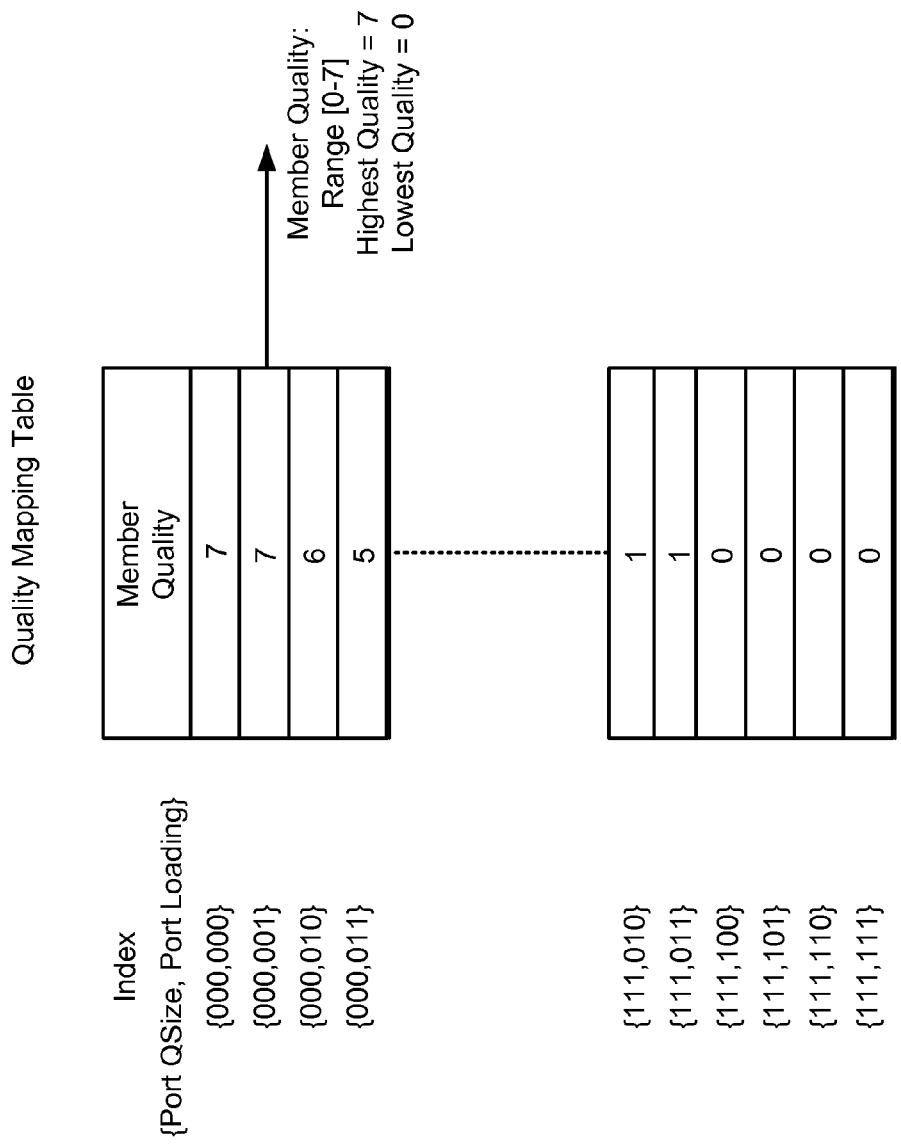

DYNAMIC LOAD BALANCING

CROSS REFERENCE TO RELATED APPLICATIONS

This application claims priority under 35 U.S.C. §119 to U.S. Provisional Patent Application Ser. No. 61/237,661, filed Aug. 27, 2009. This application is also related to co-pending U.S. patent application Ser. No. 12/780,524, entitled "DYNAMIC LOAD BALANCING USING VIRTUAL LINK CREDIT ACCOUNTING" and co-pending U.S. patent application Ser. No. 12/780,555, entitled "DYNAMIC LOAD BALANCING USING QUALITY/LOADING BANDS", both to the same inventors and filed on a date even with the present application. The disclosures of U.S. Provisional Patent Application Ser. No. 61/237,661, U.S. patent application Ser. No. 12/780,524 and U.S. patent application Ser. No. 12/780,555 are incorporated by reference herein in their entirety.

TECHNICAL FIELD

This description relates to processing of packets in data networks.

BACKGROUND

Use of network data communications for commercial and non-commercial applications continues to grow at an extremely rapid pace. This growth in the use of data communications is a driving factor for the development and implementation of data networks that provide increased bandwidth and reliability in order to meet the ever growing demand of consumers (commercial and non-commercial) for such data communication services.

One approach that is used to provide such high-bandwidth data communication and reliable data communication services is the use of aggregation groups for communicating data between nodes (network devices) in data networks. For instance, an aggregation group may be implemented using multiple data communication links between two network devices on a data network where the members of the aggregation group function together to communicate data between the two network devices. Such network devices may be directly connected, or may be connected through additional network devices. Depending on the direction of data being communicated between such devices, one device may operate as a data source and one device may operate as a data destination. The data communication links of an aggregation group (the members) between the source and destination devices may take the form of physical links or, alternatively, may take the form of virtual links. Virtual links, as the term indicates, may be implemented by defining a plurality of logical links. The plurality of logical links may then be implemented using one or more physical links, depending on the particular embodiment. The multiple data communication links/paths (whether physical or virtual links) may provide for increased aggregate bandwidth (e.g., for an aggregation group as compared to a single member of the aggregation group) and may also provide for improved reliability as such aggregation groups provide multiple communication links/paths between a source and destination.

Aggregation groups may be implemented in a number of fashions. For instance, an aggregation group may be implemented using Layer-3 (L3) Equal Cost Multi-Path (ECMP) techniques. Alternatively, an aggregation group may be implemented as a link aggregation group (LAG) in accordance with the Institute of Electrical and Electronics Engineers (IEEE) 802.3ad standard. As yet another alternative, an aggregation group may be implemented as a Hi-Gig trunk (e.g., using four 2.5 gigabit-per-second (Gbps) data traffic links to form a 10 Gbps trunk). Of course, other approaches for implementing an aggregation group may be used.

In order to assign data flows to the members of an aggregation group, hash-based load balancing techniques are used to assign each data flow that is processed by a network device to a respective member of the aggregation group (e.g., one of the individual physical or virtual links). A data flow may be defined in a number of ways. For instance, a data flow may be defined as a flow that includes data packets that are associated with an individual application and/or user, which may be referred to as a micro-flow. Alternatively, a data flow may be defined as a flow that includes packets from different micro-flows that hash to the same value. Such a data flow may be termed a macro-flow. Accordingly, macro-flows may include multiple micro-flows. For purposes of clarity, the term "flow" or "data flow," as used herein, may refer to any data flow (e.g., micro-flows or macro-flows) where packets included in the flow have a common set of packet fields and, therefore, hash to the same value using those common values to generate hash values, even if the packets in a data flow are not associated with a single user or single application. Such packet fields may include, for example, a source address, a destination address, a packet priority (such as indicated in respective p-bits of the packets), a protocol identifier, among a number of other characteristics.

Using hash based load-balancing, a fixed set of packet fields may be defined for use in member assignment. When a packet arrives, the packet may indicate an aggregation group that is to be used to communicate the packet. A hash value is then generated based on the values of the fixed set of fields in each of the packets (e.g., using an XOR hash or a cyclic redundancy check (CRC) hash). A member of the aggregation group indicated in the packet is then assigned based on the hash value using a mathematical transformation of the hash value. For instance, a modulo operation may be performed on the hash value, such as, Hash Value mod k, where k is the number of members of the designated aggregation group.

While such hash based approaches may provide for random statistical distribution of flows across aggregate members, such approaches have certain drawbacks. For instance, if there are large differences in the amount data being communicated in a flow or flows that are assigned to one aggregate member as compared to the amount of data being communicated by a flow or flows that are assigned to another aggregate member, this situation may result in a significant imbalance in the amount of data traffic being communicated by members of an aggregation group. Such imbalances may result in data congestion, packets being dropped and, therefore, inefficient use of available bandwidth. For instance, one member of an aggregation group could be oversubscribed (receive more data than it can transmit in a give time) while other members of the aggregation group are idle or carry very little data traffic.

SUMMARY

A method and/or apparatus for dynamic load balancing of data traffic in a data network, substantially as shown in and/or described in connection with at least one of the figures, as set forth more completely in the claims.

BRIEF DESCRIPTION OF THE DRAWINGS

FIGS. 4A and 4B are diagrams illustrating an example flow set table and an approach for indexing the flow set table in accordance with an example embodiment.

FIGS. 5A and 5B are tables illustrating quality metric quantization in accordance with an example embodiment.

FIG. 5C is a diagram illustrating a quality mapping table based on the quality metrics of FIGS. 5A and 5B in accordance with an example embodiment.

DETAILED DESCRIPTION

Figure 1:
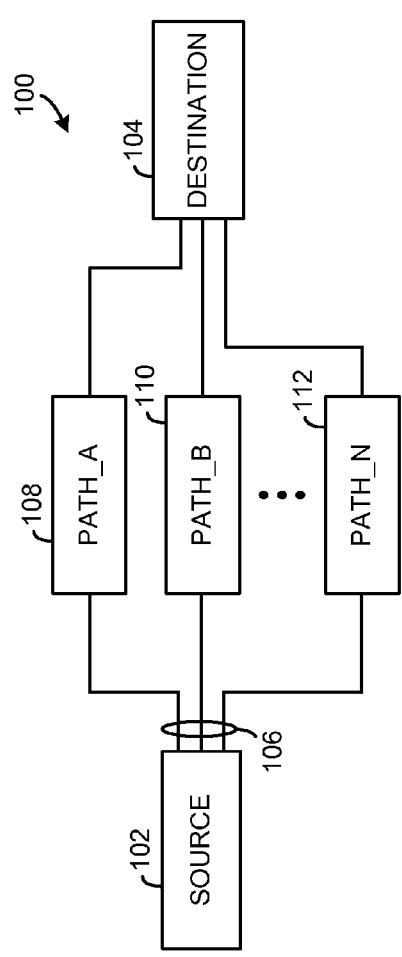
FIG. 1 is a block diagram illustrating a data network in accordance with an example embodiment.

FIG. 1 is a block diagram illustrating a data network 100 in accordance with an example embodiment, which may be used to implement the techniques described herein. The network 100 may be part of a larger network, such as, for example, a local area network, a wireless network, a public network (such as the Internet), or a number of other data network configurations. The network 100 includes a source network device (source) 102 and a destination network device (destination) 104. In this example, data packets included in one or more data flows may be sent from the source 102 to the destination 104. The source 102 and the destination may take a number of forms and may be used to implement different layers of a packet communication protocol. For example, the source 102 and the destination 104 may take the form of network switches, routers, network interface cards, or other appropriate data communication device.

The designation of the source 102 and the destination 104 in this example is by way of illustration. In other embodiments, the source 102 and the destination 104 may be reversed. In still other embodiments, network devices (such as the source 102 and the destination 104) may act as a source for outgoing data flows departing from the respective device and act as a destination for incoming data flow arriving into the respective device (e.g., data communication between network devices may be bi-directional).

As shown in FIG. 1, the network 100 also includes an aggregation group 106 that may be used to communicate data between the source 102 and the destination 104. The aggregation group 106 may include a plurality of physical links between the source 102 and the destination 104. Alternatively, the aggregation group 106 may include a plurality of virtual links that are implemented using one or more physical links between the source 102 and the destination 104. In the example shown in FIG. 1, the aggregation group 106 includes N aggregate members. As shown in FIG. 1, these aggregate members may take the form of Path_A_108, Path_B 110 through Path_N 112. Each of the paths 108-112 may be a physical link or a virtual link, as appropriate for the particular embodiment. For instance, the paths 108-112 of the aggregation group 106 may take the form of L3 ECMP next hop links, LAG communication links or HiGig communication links, as some examples. Of course, other types of aggregation groups may be used.

Selection of members of the aggregation group 106 for data flows sent from the source 102 to the destination 104 may made using the techniques described herein. Briefly, selection of a member of the aggregation group 106 (Path_A_108, Path_B 110, etc.) for communicating a data flow may be based, for example, on (i) the loading of each aggregate member when the flow is being assigned, (ii) changes in loading conditions among the aggregate members and (iii) whether a given flow has been idle for a long enough period of time that it may be considered as a "new" flow and assigned to a different aggregate member without risk of packets arriving out of order. Such reassignment may be done by taking the skew of packet transmission times for each of the paths into account, such as is the manner described below with respect to FIG. 3.

Figure 2:
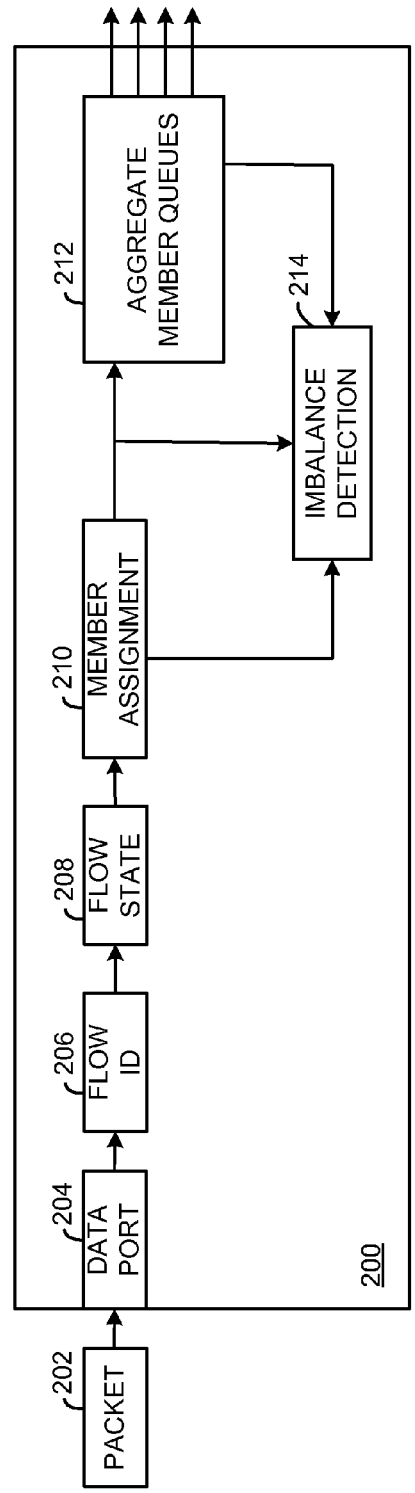
FIG. 2 is a block diagram illustrating a network device in accordance with an example embodiment.

FIG. 2 is a block diagram illustrating a network device 200 in accordance with an example embodiment. The network device 200 may be used to implement the data traffic load balancing techniques described herein. For instance, the network device 200 may be configured to dynamically assign data flows to members of an aggregation group associated with it. Such member assignments may take into account the relative loading of the aggregation group's members (e.g., physical links or virtual links) and/or changes in the loading conditions of the aggregation group's members. Further, the network device 200 may be configured to re-assign data flows from one aggregate member to another aggregate member when those flows have been inactive for a sufficient period of time so as to prevent re-ordering of packets of the data flows upon arrival at a next hop network device or a destination network device.

As shown in FIG. 2, the network device 200 may receive a packet 202 at a data port 204. After the packet 202 is received at the data port 204, a flow identification (flow ID) module 206 may process the packet 202 to determine a flow ID for a data flow to which the data packet 202 belongs. An example approach for determining a flow ID is briefly described here and is shown in further detail in FIG. 4. The flow ID may be determined from the packet 202 by first generating a hash value from the packet 202 and using the hash value to determine a corresponding index for the data flow, such as by using an appropriate mathematical transformation (e.g., a modulo operation). In an example embodiment, the hash value may be determined from a set of packet fields that remain fixed for a given data flow (micro-flow or macro-flow). Depending on the particular situation, a flow ID may correspond with a single active data flow (e.g., a micro-flow) or may correspond with multiple data flow that are active concurrently (e.g., a macro-flow).

The determined index may be combined with one or more offsets to determine the flow ID, where the flow ID corresponds with an entry in a flow set table, such as the example flow set table illustrated in FIG. 4 and described further below. Such offsets may include, for example, a first offset corresponding with an aggregation group identified in the packet 202. Additionally, the offsets may include a second offset that corresponds with a priority of the packet (and the corresponding data flow). The flow ID module may combine the determined index with the one or more offsets to produce the flow ID for the packet 202.

In the network device 200, a flow state module 208 may be configured to determine a state of the data flow with which the packet 202 is associated. The flow state module 208 may make this determination, for example, by examining an entry in the flow set table that corresponds with the flow ID of the packet 202 as determined by the flow ID module 206. Based on the corresponding flow set table entry, the flow state module 208 may determine that the network device 200 has not previously processed any packets having the determined flow ID for the packet 202 (new flow). In this situation, the flow set table entry may be invalid or contain initialization values (e.g., all zeros or ones). Alternatively, the flow state module 208 may determine, from the flow set table entry, that the packet 202 is associated with a data flow that has been previously observed by the network device 200 and is actively transmitting data (active flow). In this situation, the network device 200 should continue using the most recent aggregate member assignment (as indicated by the flow set table entry) to prevent re-ordering of packets. As yet another alternative, the flow state module 208 may determine that the packet 202 is associated with a data flow for which the network device 200 has previously processed packets, but that the data flow has been inactive for a sufficient period of time (such as discussed with respect to FIG. 3 below) that assigning the data flow to a different aggregate member would be unlikely to result in packet reordering once the packet 202 reaches a destination network device (next hop device) for the packet 202 (inactive flow).

In the network device 200, once the flow state module 208 determines the state of the data flow associated with the packet 202, such as in the fashion described above, a member assignment module 210 may determine which member of an aggregation group of the network device 200 should be used to communicate the packet 202 to its next destination. As previously discussed, the aggregation group members may comprise physical links or virtual links, depending on the particular embodiment.

If the data flow associated with the data packet 202 is determined to be eligible for member assignment (e.g., has not been previously seen) or reassignment (e.g., has been inactive sufficiently long enough to prevent re-ordering), the network device 200 may assign the data flow associated with the packet 202 to an aggregation group member using one or more respective quality metrics associated with each of the aggregation group members, such as using the techniques described herein. Once a member assignment has been made, the network device 200 (e.g., the member assignment module 210) may be configured to make corresponding entries in a flow set table, where the entries indicate the assigned member as well as a timestamp indicating a time at which the packet 202 is processed. Such timestamps may be used to determine whether data flows processed by the network device 200 have been inactive long enough to allow for reassignment without significant risk of causing packet reordering.

If a data flow associated with the data packet 202 is not eligible for assignment or reassignment (e.g., has been previously seen and has packets being actively transmitted), the network device 200 (e.g., the member assignment module 210) may be configured to use a previously assigned aggregation group member, such as indicated in a flow set table entry associated with the data flow. Each time a packet associated with an active data flow is processed, the flow set table entry for that flow may be updated with a new timestamp. Using such an approach, the delay between packets of a given data flow can be readily determined, where the determined delay between packets of the given data flow may be used to determine whether the given data flow may receive a new assignment without significant risk of packet reordering resulting.

After the assigned aggregation group member is determined (by assignment, reassignment or using an existing assignment), the network device 200 may queue the data packet 202 in a respective data queue for the assigned aggregation group member in a set of aggregate member data queues 212 for the aggregation group. The network device 200 may then communicate the data packet 202, in turn with other packets queued in the aggregate member queues 212, to another network device, such as a next hop network device or a destination network device, using the assigned aggregation group member.

As shown in FIG. 2, the network device 200 may also include an imbalance detection module 214. The imbalance detection module 214 may receive information regarding member assignments for data packets from member assignment module 210 and may also receive information regarding the amount of data that is queued for each member of an aggregation group from the aggregate member queues 212. Based on the information received from the member assignment module 210 and the aggregate member queues 212, the imbalance detection module 214 may determine one or more quality metrics for the aggregation group members, where the quality metrics are indicative of data traffic loading for each aggregate member. These quality metrics may be communicated to the member assignment module 210 and used by the member assignment module 210 when making aggregation group member assignments and reassignments for data flows being processed by the network device 200.

Figure 3:
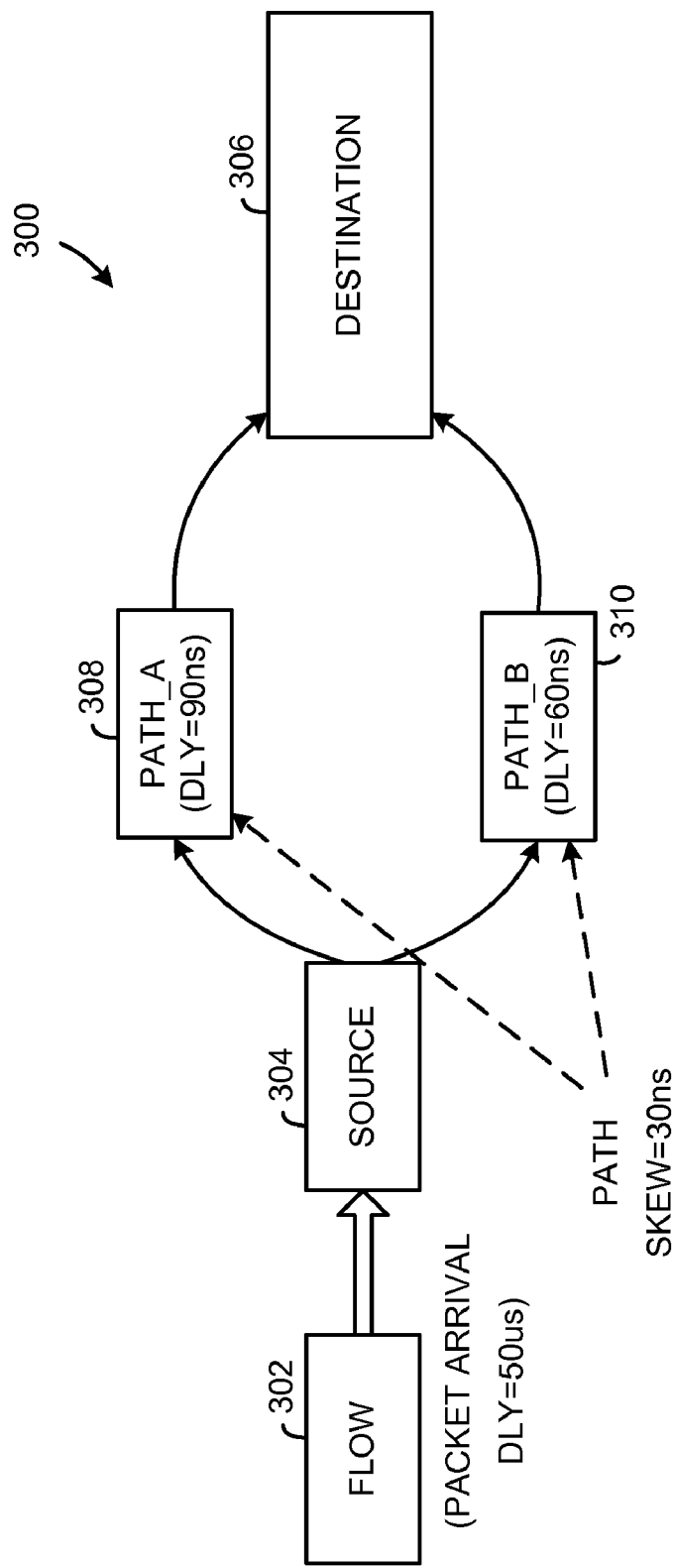
FIG. 3 is a block diagram illustrating an approach for determining if a data flow is eligible for load balancing reassignment in accordance with an example embodiment.

FIG. 3 is a block diagram illustrating a network 300 that may be used to implement an approach for determining if a data flow is eligible for load balancing reassignment in accordance with an example embodiment. In the network 300, a data flow 302 arrives at a source network device 304. The source 304, in this example, has two aggregate members to which it can assign the data flow 302, Path_A 308 and Path_B 310. For this example, it is presumed that Path_A 308 is initially selected as the aggregate member assignment for transmitting packets from the source 304 to a destination 306. As shown in FIG. 3, an end-to-end delay for the Path_A 308 is 90 μs, while the end-to-end delay for the Path_B 310 is 60 μs. In this example, the skew between the Path_A 308 and the Path_B 310 is therefore 30 μs.

As indicated in FIG. 3, the data flow 304 has a packet arrival delay of 50 μs between two sequential packets of the data flow 304. In this instance, the packet arrival delay of 50 μs is greater than the path skew of 30 μs is between the aggregate members of the network 300. Accordingly, in this situation, the flow 304 could be reassigned from the Path_A 308 to the Path_B 310 without significant risk that reordering would occur at the destination 306.

In such approaches, the path skew can be estimated or measured (e.g., using software). Such path skew measurements may be used to determine an inactivity threshold for use in determining whether data flows are eligible for aggregation group member reassignment. For instance, path skew between the various paths of an aggregation group could be measured or estimated. The largest path skew value (or the largest path skew value plus some margin) could then be used as an inactivity threshold. Using such an approach, if the arrival delay of packets of a given data flow is greater than the inactivity threshold, the corresponding data flow may then be eligible to receive a new aggregation group member assignment. In yet another approach, packets of a given data flow may be considered eligible to receive a new aggregation group member assignment under all conditions.

In other approaches, path skew values between individual paths may be used for determining inactivity durations to determine whether or not data flows are eligible for aggregation group member reassignment. Measurements or estimates of path skews (and the determination of corresponding inactivity thresholds) could be made dynamically (e.g., during processing of data flows). Alternatively, measurements or estimates of path skews (and the determination of corresponding inactivity thresholds) could be made as part of initialization of a corresponding network device and statically set.

In an example embodiment, such inactivity thresholds may be used to determine whether a data flow is active or inactive (as discussed above) for purposes of determining whether data flows are eligible for aggregation group member reassignment. For instance, determining that a data flow is inactive may include determining a difference between a previous timestamp associated with the flow in a flow set table and a timestamp associated with the current packet. If the difference is greater than an inactivity threshold, the flow would be considered to be inactive and eligible for reassignment to a new aggregate member. If, however, the difference is less than or equal to the inactivity threshold, the flow would be considered to be active and, therefore, not eligible for reassignment.

FIGS. 4A and 4B are diagrams illustrating an example flow set table 410 and an approach for indexing the flow set table 410 in accordance with an example embodiment. FIG. 4B, specifically, is a diagram of an example flow set table entry 412, such as may be included in the flow set table 410 shown in FIG. 4A. The approaches illustrated in FIGS. 4A and 4B may be implemented in, for example, the network device 200 illustrated in FIG. 2. Of course, the approaches illustrated in FIGS. 4A and 4B may be implemented in conjunction with other network device configurations as well.

In FIG. 4A, a packet 402 may be provided to an index and offset determination module 408. In the approach illustrated in FIG. 4A, the index and offset determination module 408 may be used to determine a flow ID, such as was previously described. As shown in FIG. 4A, the packet 402 may include an aggregation group identifier (ID) 404 and a priority 406. The priority 406 may take the form of p-bits of the packet 402, or may be included in the packet in another appropriate fashion. As is known, the packet 402 may include a number of other elements, such as various header fields and a data payload, for example.

The index and offset determination module 408 may determine an index value for the packet 402 based on one or more fields of the packet. As previously discussed, a fixed set of packet fields that remain constant (produce the same index value) for a given data flow may be used to determine the index for the packet 402. For instance, a hash value may be calculated and/or one mathematical operations may be performed on the fixed set of packet fields to determine the index. In certain embodiments, the aggregation group ID 404 and/or the priority 406 of the packet 402 may be used to determine the number of aggregation group members in the corresponding aggregation group and/or priority set when determining the index. For instance, the number of members in a corresponding aggregation group and priority set of that aggregation group may be used in a modulo function to determine the index value for the packet 402.

In the approach shown in FIG. 4A, a determined index value may be combined with two offset values to determine a flow ID that is used to index the flow set table 410. For instance, in FIG. 4A, the index value for the packet 402 may be combined with an aggregation group offset and a priority set offset to determine the flow ID for the packet 402. As shown in FIG. 4A, the flow set table 410 includes flow set entries for each of three aggregation groups 1-3 and two priority sets 0 and 1 within each aggregation group. In this example, the aggregation group 1 may have an offset of 0, since the aggregation group 1 flow set entries are at the top of the flow set table 410. The aggregation group 2 may have an offset of 5 as the first entry for the aggregation group 2 is at the fifth location in the flow set table 410. Similarly, in the example shown in FIG. 4A, the aggregation group 3 may have an offset of 11 as the first entry for the aggregation group 3 is at the eleventh location in the flow set table 410.

In the example shown in FIG. 4A, a flow ID may also include a second offset corresponding with a priority 406 of the packet 402. As shown in FIG. 4A, the number of flow set table entries for each priority set may vary by aggregation group. Therefore, the priority set offsets for the packet 402 may depend on the aggregation group ID 402, as well as the priority 406. For example, the priority set offsets for priority set 0 for aggregation groups 1-3 are all 0, because the priority set 0 entries for each of the aggregation groups 1-3 are listed first in their respective portions of the flow set table 410. However, the priority set offset for aggregation group 1, priority set 1 would be 3, the priority set offset for aggregation group 2, priority set 1 would be 5, and the priority set offset for aggregation group 3, priority set 1 would be 3, as may be seen in FIG. 4A. In other embodiments, the entries of the flow set table 410 may be arranged differently, such as being grouped first by priority set and then being group by aggregation group ID.

As shown in FIG. 4B, the flow set table entry 412 may include an index 414, an assigned member entry 416 and a time stamp 418 for a last packet of a data flow corresponding with the flow set entry 412. In this example, the aggregation group that is used to transmit the packet 402 is explicitly indicated in the packet 402, as is the priority of the packet and may be used to determine the aggregation group offset and priority offset. Therefore, in this example, the index 414 may be an index to a specific flow set table entry 412 within the portion of the flow set table 410 that corresponds with the aggregation group ID 404 and the priority 406 indicated in the packet 402.

The assigned member entry 416 indicates a currently assigned aggregation group member for a corresponding data flow and the time stamp 418 is the time stamp of the last packet that was processed for the corresponding data flow. The time stamp entry 418 may be subtracted from a time stamp included in a next packet of the corresponding data flow to determine whether the data flow is active (e.g., the difference is less than or equal to an inactivity threshold) or inactive (e.g., the difference is greater than the inactivity threshold). As previously discussed, if it is determined that the corresponding data flow is active, the aggregate member indicated by the member assignment 416 will be used to transmit the packet 402. However, if it is determined that the corresponding data flow is inactive, the corresponding data flow may receive a new aggregate member assignment, which may be the same aggregate member as the previous aggregate member assignment, or may be a different aggregate member, depending the respective states (e.g., data communication loading) of the corresponding aggregation group members that are available for assignment.

In this example, when an aggregate member assignment is made, the member assignment entry 416 of the flow set entry 412 for the corresponding data flow is updated to reflect the current aggregate member assignment. Further, each time a packet 402 of the corresponding data flow is processed, the time-stamp entry 418 of the corresponding flow set table entry 412 is updated using, for example, a current system time. Alternatively, the time stamp entry 418 may be updated using a time stamp provided by a network device that is processing the corresponding data flow.

FIGS. 5A and 5B are, respectively, tables 500 and 510 illustrating quality metric quantization in accordance with an example embodiment. FIG. 5C is a diagram illustrating a quality mapping table based on the quality metrics of FIGS. 5A and 5B in accordance with an example embodiment. The approach illustrated in FIGS. 5A-5C may be used to assign a respective combined quality metric to each member of an aggregation group. These respective quality metrics may then be grouped into quality bands or loading bands. In an example network device, aggregate member assignments for data flows being processed by a network device may be made from a subset of aggregate members that have the quality metrics in the first non-empty quality band, or the highest quality band that includes at least one aggregate member. The quality metrics described with respect to FIGS. 5A-5C are given by way of example and other quality metrics may be used when assigning aggregate members for transmitting data flows using the techniques described herein.

FIG. 5A is a table 500 in accordance with an example embodiment that may be used to quantize port loading into a first quality metric. In the table 500, the first column includes port loading threshold values, which may be compared with the amount data that is assigned to each aggregate member of an aggregation group over a given period of time. The threshold values in table 500 are given by way of example. In other embodiments, different threshold values may be used. In other embodiments, a different number of threshold values (fewer or more threshold values) may be used.

In the example table 500, eight port loading threshold values are used, which correspond with a three bit quantization value (binary values 000-111). As shown in table 500 in FIG. 5A, port loading of less than 100 kilobytes (kB), in this example, would be quantized with a port loading quality metric of 000. As the threshold values increase in table 500, the corresponding quantization values for the port loading quality metric also increase to represent the higher loading (and lower quality metric). For instance, port (aggregate member) loading between 400 kB and 500 kB would be quantized with a port loading quality metric of 100. For sake of brevity, each threshold value in table 500 (and table 510) is not specifically described here.

In an example network device, port loading may be periodically measured and compared with the threshold values in the table 500, such as using an imbalance detection module 214 as illustrated in FIG. 2. The measured port loading values for each member that are compared with the threshold values in table 500 may indicate instantaneous loading or, alternatively, may indicate average loading over time. For instance, loading may be computed using a weighted average calculation. In other embodiments, the table 500 could be used to quantify respective loading quality metrics for priority sets instead of aggregate members (ports).

FIG. 5B is a table 510 in accordance with an example embodiment that may be used to quantify data queue sizes into a second set of respective quality metrics (e.g., for members of an aggregation group or, alternatively, for a plurality of priority sets). In the table 510, the first column includes queue size threshold values (e.g., in number of cells or bytes), which may be compared with instantaneous queue sizes or average queue sizes (e.g., weighted average queue sizes) to determine a corresponding queue size quality metric. As with the table 500, the threshold values in table 510 are given by way of example. In other embodiments, different threshold values may be used. In other embodiments, a different number of threshold values (fewer or more threshold values) may be used.

In the example table 510, eight queue size threshold values are used, which each correspond with a respective three bit quantization value (binary values 000-111). As shown in table 510 in FIG. 5B, a queue size of less than 100 (e.g., 100 cells or packets), in this example, would be quantized with a queue size quality metric of 000. As with the table 500, as the threshold values increase in table 510, the corresponding quantization values for the queue size quality metric also increase to represent the larger queue sizes (and lower quality metric). For instance, queue size measurements between 500 and 1000 would be quantized with a queue size quality metric of 011.

In an example network device, queue sizes may be periodically measured and compared with the threshold values in the table 510. For instance, queue size information could be provided to the imbalance detection module 214 of the network device 200 by the aggregate member queues. The measured queue size values for each aggregate member that are compared with the threshold values in table 510 may indicate instantaneous queue sizes or, alternatively, may indicate average queue sizes over time, as was noted above. In other embodiments, as also indicated above, the table 510 could be used to quantify queue size quality metrics for a set of priority queues (priority set queues) associated with the aggregate member.

FIG. 5C is a diagram that illustrates an approach for combining (mapping) the quality metrics described above with respect to tables 500 and 510 into a single quality metric with a value between 0 and 7. In example embodiments, different mapping relationships for combining those quality metrics may be used. The particular mapping arrangement may depend on the embodiment and may, for example, be selected by a user. Alternatively, such quality metric mapping may be dynamic and adjusted over time in order to improve the efficiency of aggregate member assignments in a network device. Such dynamic adjustment may be performed by the user, software, or some other control mechanism. The particular approach shown in FIG. 5C is given by way of example. It will be appreciated that a number of other possible mapping relationships are possible.

As shown in FIG. 5C, when the values of the port loading quality metric of FIG. 5A and the values of the queue size quality metric of FIG. 5B are combined and arranged in the sequence as shown in FIG. 5C, those combined quality metrics may be mapped to a single quality metric, as shown in FIG. 5C, designated member quality. In this example, a combined member quality metric of 7 represents the highest quality members, while a combined quality metric of 0 represents the lowest quality members. For instance, when both the queue size metric and the port loading metric are 000, the combined quality metric maps to 7. Also, when both the queue size quality metric and the port loading quality metric are 111, the combined quality metric maps to 0. The particular mapping arrangement used to generate such a combined quality metric may be referenced as a quality mapping function and may be accomplished in a number of fashions, such as using a lookup table, using one or more mathematical transformations, such as comparison with a set of thresholds, or other appropriate techniques. Depending on the particular embodiment, a quality mapping function for each aggregation group of a network device may be arbitrarily selected from a plurality of quality mapping functions, such as the quality mapping function illustrated in FIG. 5C.

After respective combined quality metrics are determined for a set of aggregate members, those combined quality metrics may be grouped into loading/quality bands corresponding with the combined quality metrics. Such quality bands may then be used to assign aggregate members to data flows, such as using the approaches described herein.

Figure 6:
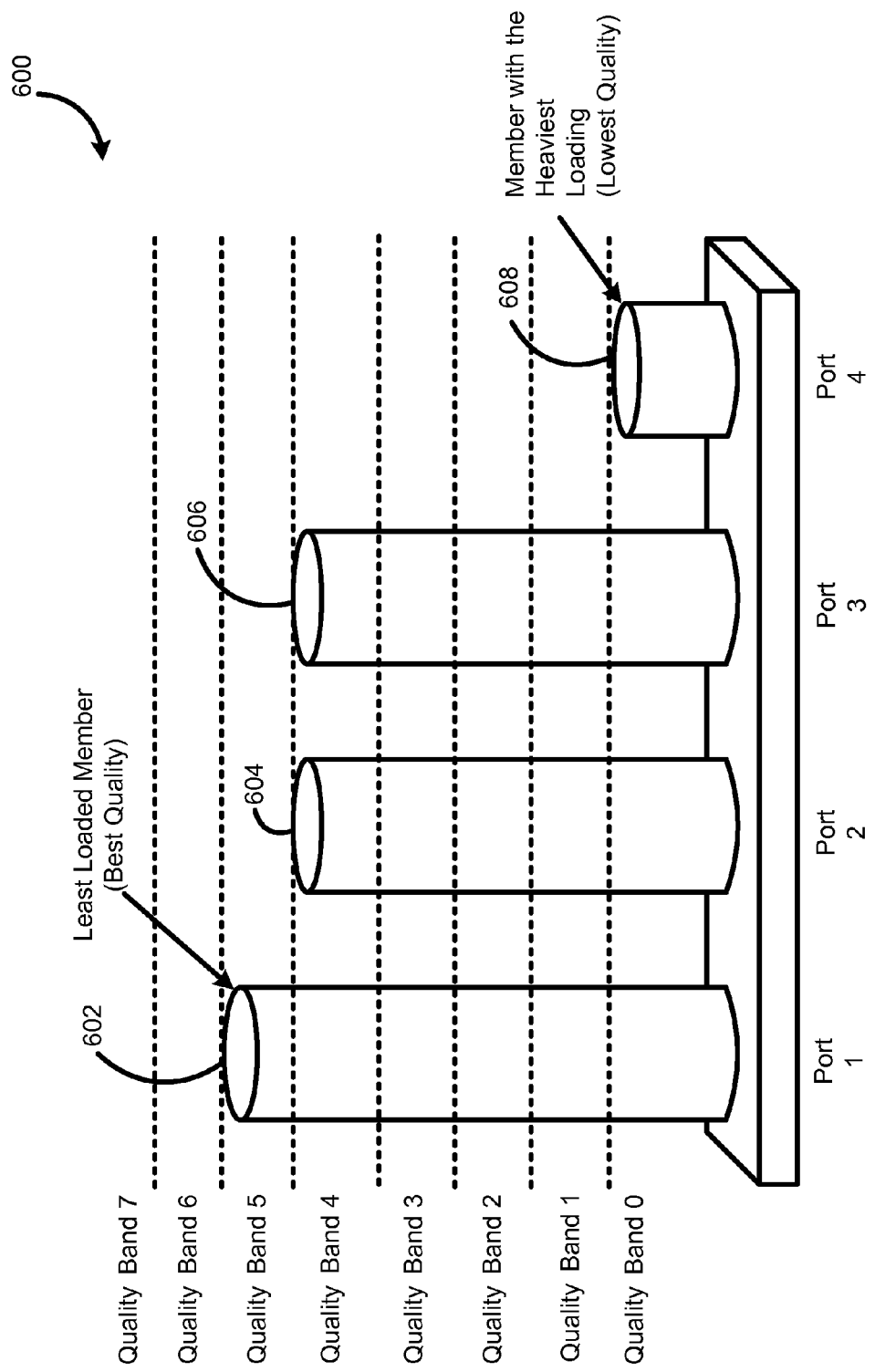
FIG. 6 is a graph illustrating quality/loading bands in accordance with an example embodiment.

FIG. 6 is a graph 600 that illustrates an example of quality band groupings for an aggregation group having four members (Port 1-Port 4). In other embodiments, the graph 600 may represent quality band groupings for a single priority set. The groupings shown in the graph 600 correspond with a quality metric having values in a range of 0-7, such as the combined quality metric described above with respect to FIG. 5C. In this example, as shown in the graph 600, the quality metric 602 for Port 1 is in Quality Band 5, which may correspond with a combined quality of metric of 5. In the table 600, the quality metrics 604 and 606 for Port 2 and Port 3, respectively, are in Quality Band 4, which may correspond with a combined quality metric of 4. Also in the table 600, the quality metric 608 is in Quality Band 0, which may correspond with a combined quality metric of 0.

In this example, when assigning an aggregate member to a data flow (e.g., a new data flow or inactive data flow, as were described above) using the techniques described herein, a network device may examine the groupings in the graph 600 to select the highest non-empty quality band (the highest quality band having at least one aggregate member in it), which in this case is Quality Band 5. The network device may them assign an aggregate member to the data flow from the selected quality band. In this case, because a single aggregate member (Port 1) is present in Quality Band 5, the selection process is straightforward and Port 1 would be selected as the assigned member for the data flow for which an aggregate member assignment is being made. However, in situations where more than one aggregate member is present in the highest non-empty quality band, other approaches for aggregate member selection may be used.

As some examples, an aggregate member assignment may be made by randomly selecting an aggregate member from the aggregate members present in the highest non-empty quality band. In other embodiments, a round-robin selection method may be used for aggregate member assignment selection. In still other embodiments, other deterministic and non-deterministic approaches for aggregate member selection may be used. For instance, in one approach, in one approach member assignment could be weighted based on quality metrics, such as those described herein.

Figure 7:
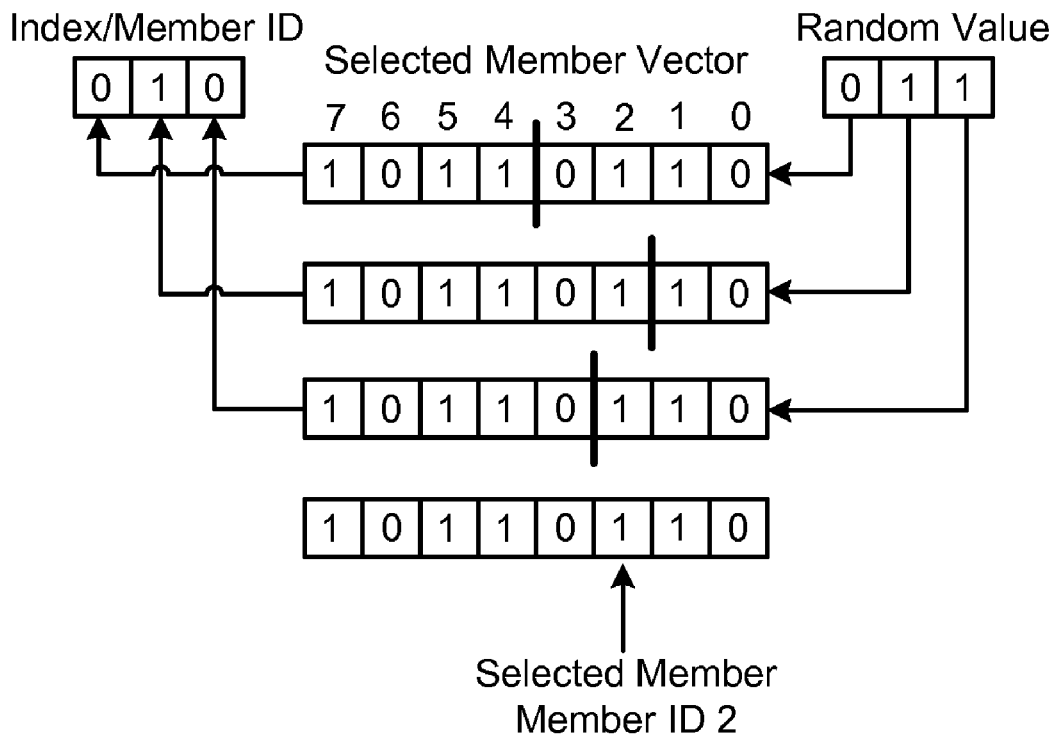
FIG. 7 is a diagram illustrating an approach for random selection of an aggregate member in accordance with an example embodiment.

FIG. 7 is a diagram illustrating an approach for random selection of an aggregate member using a binary search in accordance with an example embodiment. In the example shown in FIG. 7, a member assignment selection is made from a set of eight aggregate members, where 5 of those members are present in a selected quality band (which may or may not be a highest, non-empty quality band). In the example shown in FIG. 7, the aggregate members present in the selected quality band are shown using an 8-bit selected member vector. The members present in the quality band are represented by a '1' in the vector, while the members not present are represented by a '0' in the vector.

In this example, the value of the selected member vector is assumed, for purposes of illustration, to have a binary value of '10110110.' This value may directly represent the aggregate members present in the selected quality band or could be produced by shifting an initial vector in order to increase randomness of aggregate member selection. Other techniques for increasing selection randomness may also be employed.

Because the loading band vector in this example is 8-bits in length, a total of three binary search stages (iterations) are used to select an eligible member. In this example, a random three bit selection value may also be generated, where the random selection value is used to break ties that may occur at each binary search stage. A tie occurs when eligible members exist to both the left and right of the binary search point. In this example, the selection value is given as binary '011.'

In each stage, the selected member vector is split into two halves termed an upper vector and a lower vector. In the first stage shown in FIG. 7, both the upper vector (1011) and lower vector (0110) have an eligible member. In this situation, the most significant bit (MSB) of the random selection value may be used to determine which vector is selected. Since the MSB of the random selection value is '0', in this example, the lower vector (to the right of the split) is selected and the MSB of the Index/Member ID is set to '0'. In other embodiments, a '0' in the corresponding selection value bit location may indicate that the upper vector (to the left of the split) is to be selected. However, in this example, '0' indicates that the lower vector should be selected and '1' indicates that the upper vector should be selected.

In the second stage of the binary search illustrated in FIG. 7, the vector selected in the previous stage (0110) is again split into a lower vector (10) and an upper vector (01). Again, both vectors contain eligible members, thus the middle bit (bit 1) of the random selection value is used to break the tie. Because bit 1 of the random selection value is '1', in this example, the upper vector (01) is selected and bit 1 of the Index/Member ID is set to '1'.

In the third stage of the binary search illustrated in FIG. 7, the vector selected in prior round (01) is split again into an upper vector (0) and a lower vector (1). Because only the lower vector contains an eligible member, it is selected (the least significant bit (LSB), bit 0, of the random selection value is not used) and the LSB of the member ID is set to '0' result in an index of '010'.

In embodiments where an initial vector is shifted to increase randomness of eligible member selection, in order to identify the correct member in the loading band occupancy set before the shift operation, a value corresponding with the shift must be added must be added to the member ID determined by the binary search to correct for the shift. For example, if a right shift of three was used in the example shown in FIG. 7 (i.e., to shift a vector of B"10110101" to the vector B"10110110" noted above), then a value of 3 must be added to the determined member ID to correct for the shift. Therefore, in this example, after adding 3 to the member ID determined by the binary search, the corrected randomly selected member ID is 5. It will be appreciated that a number of other member selection techniques may be used to select an eligible aggregate member from a selected quality band having a plurality of eligible members present and that the foregoing described techniques are given by way of example.

FIGS. 8-12, 14 and 15 are flowcharts that illustrate methods that may be used to implement the load balancing techniques described herein. It will be appreciated that these methods may be implemented using the techniques described with respect to the other FIGs. of the application, or may be combined with each other in appropriate combinations. Further, for each of the methods described herein, the method operations may be performed in any appropriate order. For instance, in some situations, certain operations may be performed concurrently, or may be performed in a different order than illustrated and described herein.

Figure 8:
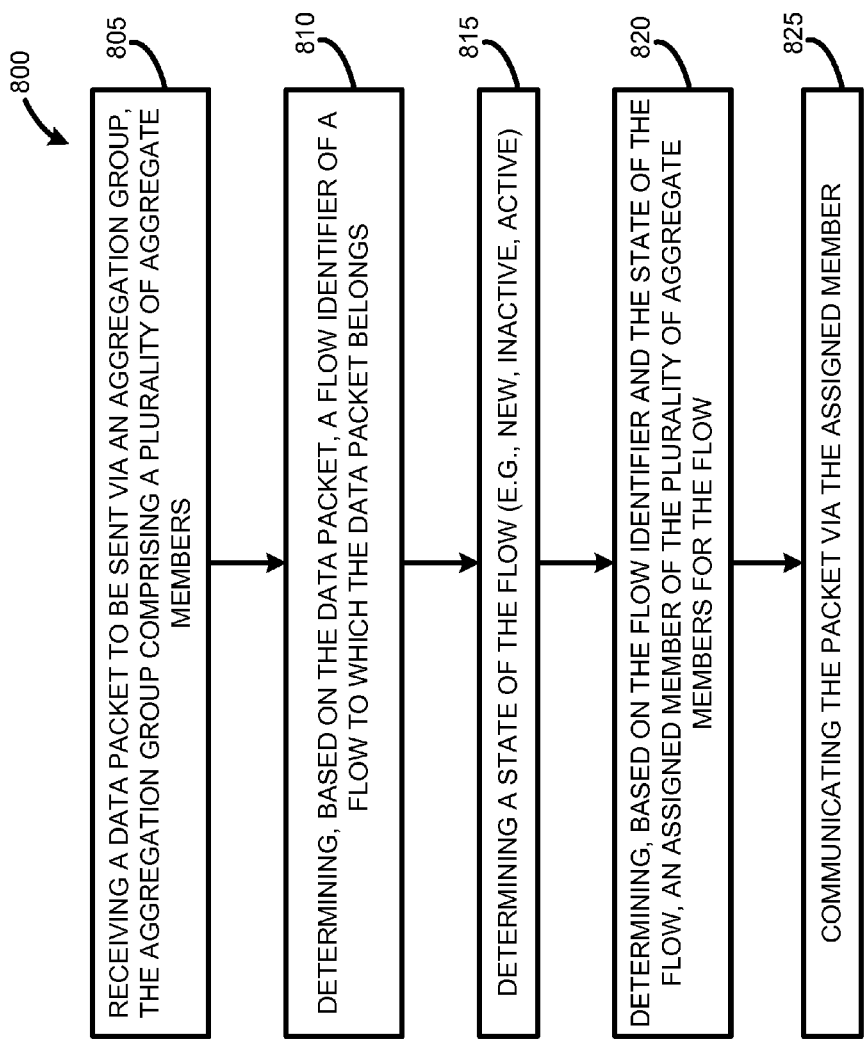
FIG. 8 is a flowchart illustrating a method for dynamic load balancing in accordance with an example embodiment.

FIG. 8 is a flowchart illustrating a method 800 for dynamic load balancing in accordance with an example embodiment. The method 800 may be implemented, for example, in the network device 200 illustrated in FIG. 2. As illustrated in FIG. 8, the method 800, at block 805 includes receiving, e.g., at a network device, a data packet to be sent via an aggregation group, where the aggregation group comprises a plurality of aggregate members. At block 810, the method 800 includes determining, based on the packet, a flow ID, such as using the approaches described above.

The method 800 may further include (though not explicitly shown in FIG. 8) indexing a flow set table (such as the flow set table 412) using the flow ID, for instance, in the manner described above. At block 815, the method 800 includes determining a state of the flow, such as by using a timestamp included in the flow set table and a timestamp associated with the current packet, or by determining that a corresponding entry in the flow set table is not valid, such as using the techniques described above. At block 820, the method 800 may include determining, based on the flow identifier and the state of the flow, an assigned member of the plurality of aggregate members for the flow, such as using quality metrics and associated quality bands, as was previously described. At block 825, the method 800 includes communicating the packet via the assigned member.

Figure 9:
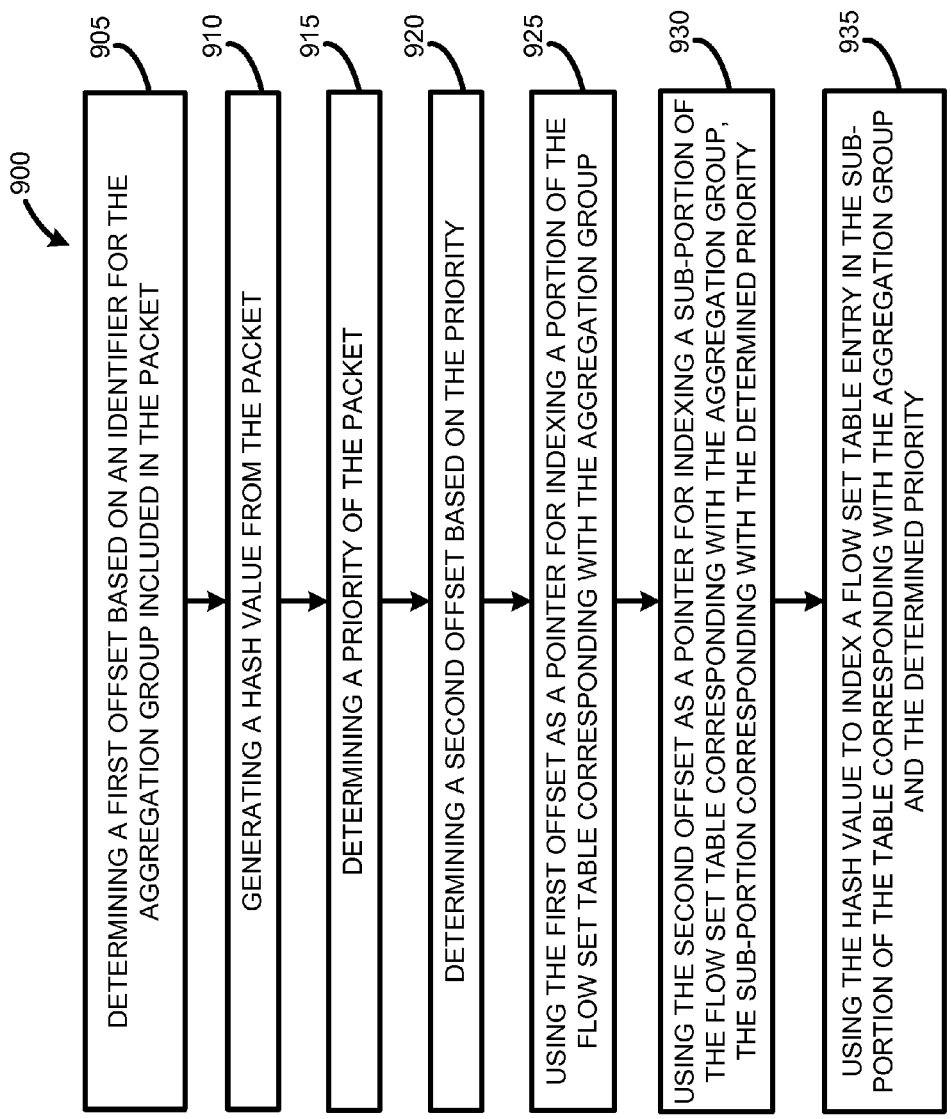
FIG. 9 is a flowchart illustrating a method for indexing a flow set table in accordance with an example embodiment.

FIG. 9 is a flowchart illustrating a method for indexing a flow set table in accordance with an example embodiment. The method 900 includes, at block 905, determining a first offset based on an identifier for the aggregation group included in the packet. The method 900 further includes, at block 910, generating a hash value from the packet, such as by using a fixed set of packet fields and a hash function (e.g., a CRC hash function or an XOR hash function). At block 915, the method 900 includes determining a priority of the packet and, at block 920, determining a second offset based on the priority. In the method 900, at block 925, the first offset may be used as a pointer for indexing a portion of the flow set table corresponding with the aggregation group. At block 930, the method 900 may include using the second offset as a pointer for indexing a sub-portion of the flow set table corresponding with the aggregation group, where the sub-portion corresponds with the determined priority and the aggregation group indicated in the packet. The method 900 further includes, at block 935, using the hash value to index a flow set table entry in the sub-portion of the table corresponding with the aggregation group and the determined priority.

Figure 10:
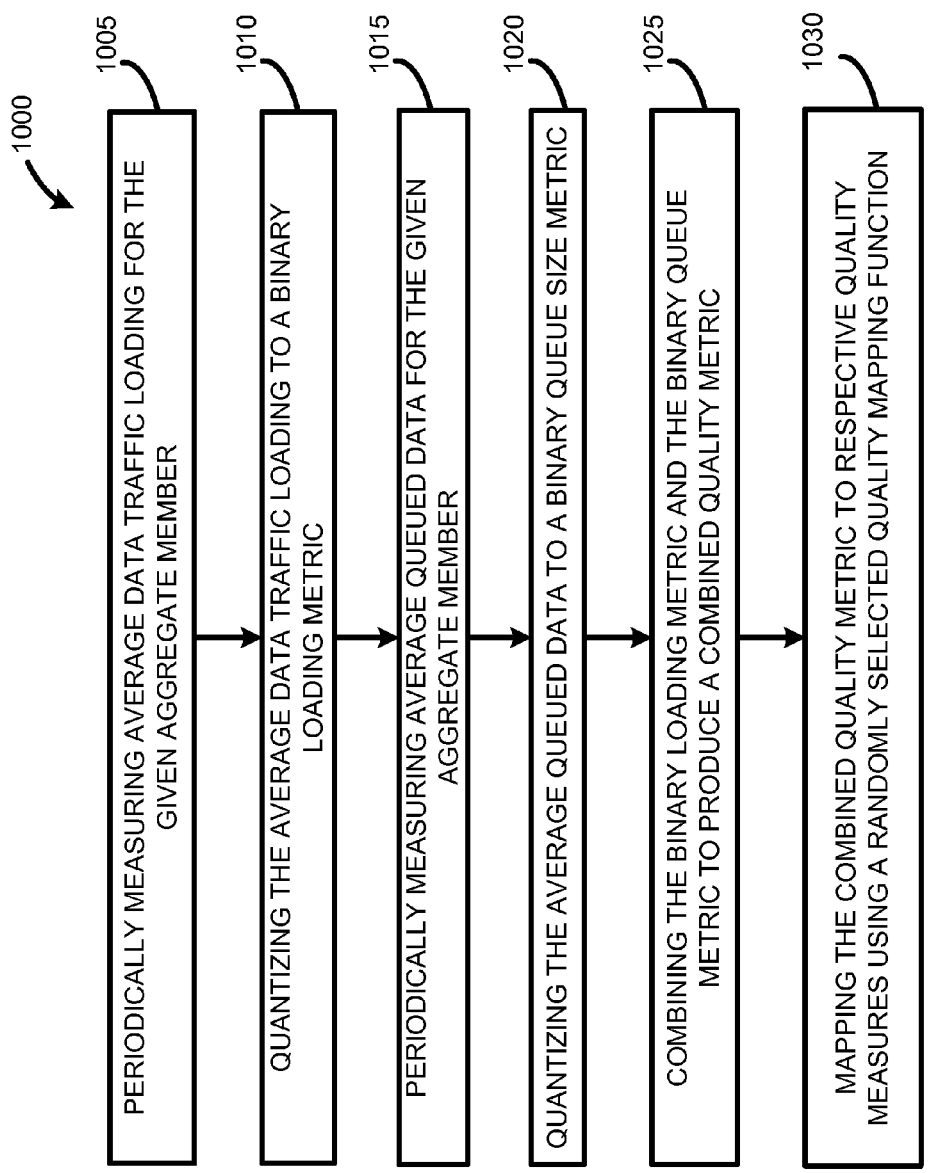
FIG. 10 is a flowchart illustrating a method for determining a quality measure in accordance with an example embodiment.

FIG. 10 is a flowchart illustrating a method 1000 for determining a quality measure for a given aggregate member in accordance with an example embodiment. The method 1000 may be used to determine a quality measure using, for example, the techniques described above with respect to FIGS. 5A-5C, though other approaches exist. The method 1000, at block 1005 includes periodically measuring average data traffic loading for the given aggregate member, such as using the imbalance detection module 214 illustrated in FIG. 2. The method 1000 further includes, at block 1010, quantizing the average data traffic loading to a binary loading metric. The quantization at block 1010 may be accomplished using the average traffic loading and the table 500 illustrated in FIG. 5A. The method 1000 may further include periodically measuring an average queued data amount for the given aggregate member, such as using the aggregate member queues 212 and/or and the imbalance detection module 214, as discussed above.

The method 1000 may further include, at block 1020, quantizing the average queued data to a binary queue size metric. The quantization at block 1020 may be accomplished using the average queued data amount measurement and the table 510 illustrated in FIG. 5B. At block 1025, the method 1000 includes combining the binary loading metric and the binary queue size metric to produce a combined quality metric, such as using the techniques illustrated in FIG. 5C. For instance, such a combined quality metric may be a concatenation of the quality metrics determined at blocks 1010 and 1020. At block 1030, the method 1000 further includes mapping the combined quality metric to a respective quality measure using a quality mapping function, as was also discussed with respect to FIG. 5C.

Figure 11:
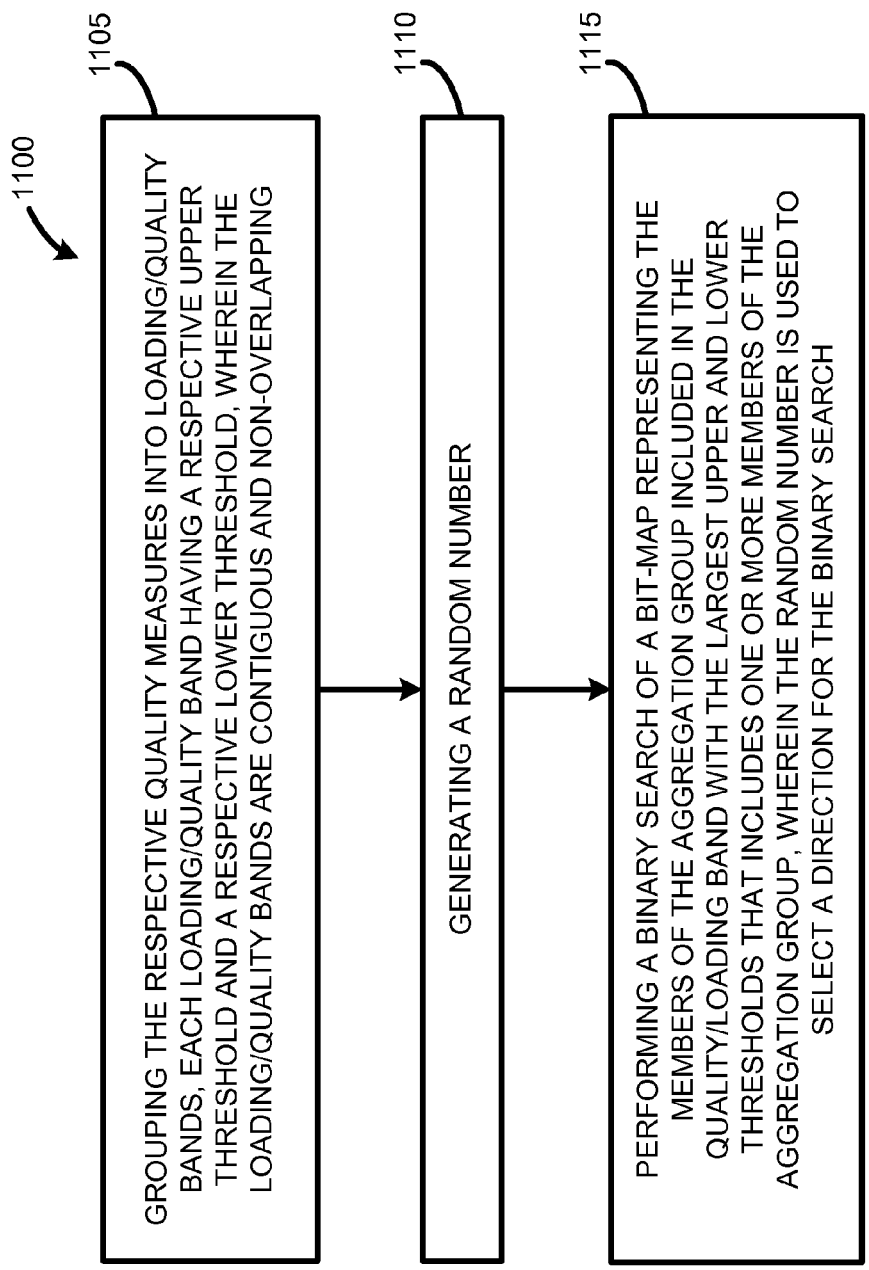
FIG. 11 is a flowchart illustrating a method for generating quality/loading bands for an aggregation group and selecting an aggregate member using the quality/loading bands in accordance with an example embodiment.

FIG. 11 is a flowchart illustrating a method 1100 for generating quality/loading bands for an aggregation group and selecting an aggregate member using the quality/loading bands in accordance with an example embodiment. The method 1100 includes, at block 1105, grouping respective quality measures for each member of an aggregation group (e.g., that are determined at block 1030 for members of the aggregation group) into loading/quality bands. Each loading/quality band may have a respective upper threshold and a respective lower threshold, wherein the loading/quality bands are contiguous and non-overlapping. For instance, the groupings may be implemented using the techniques illustrated in FIG. 6, where the quality bands correspond with the combined respective quality metrics determined at block 1030 of the method 1000 and the thresholds correspond with the values of the respective quality metrics.

The method 1100, in this example, may include, at block 1110, generating a random number, and at block 1115, performing a binary search of a bit-map representing the members of the aggregation group included in the quality/loading band with the largest upper and lower thresholds that includes one or more members of the aggregation group (e.g., eligible members). In such an approach, the random number may be used to select a direction for the binary search, such as in the manner described above with respect to the random selection value illustrated in FIG. 7. In certain embodiments, in order to be an eligible member of a quality/loading band, an aggregate member must be available for data transmission. For instance, links that are down would not be included in quality/loading bands as eligible members.

Figure 12:
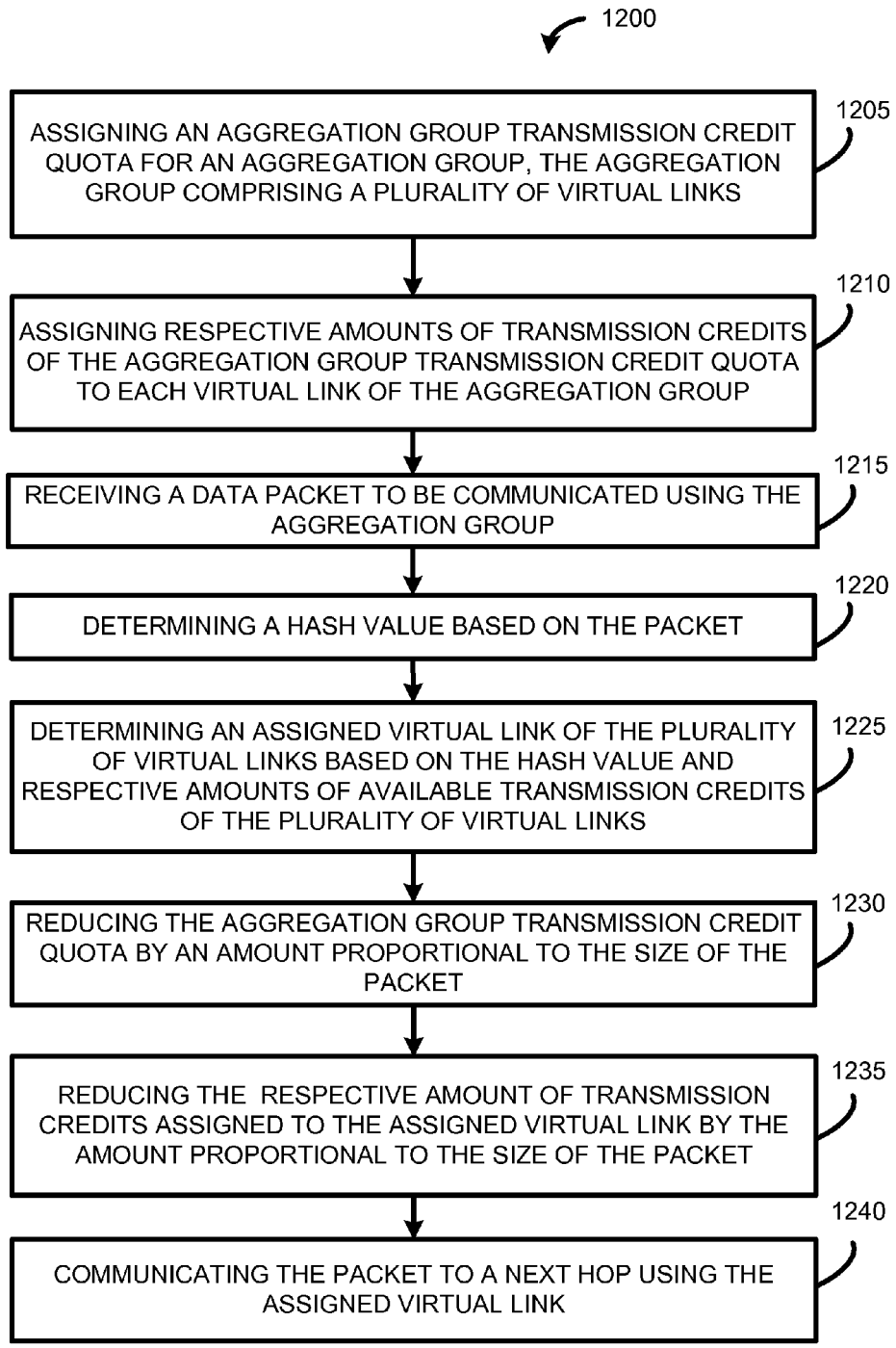
FIG. 12 is a flowchart illustrating a method for dynamic load balancing for virtual links of an aggregation group in accordance with an example embodiment.

FIG. 12 is a flowchart illustrating a method 1200 for dynamic load balancing for virtual links of an aggregation group in accordance with an example embodiment, where transmission credits are used as a measure of link quality. In such embodiments, a number available transmission credits may be used as a measure of aggregate member quality instead of the quality metrics described above with respect to FIGS. 5A-5C. Using such an approach, members of an aggregation may be grouped in quality bands based on their respective number of available transmission credits.

The method 1200 includes, at block 1205 assigning, e.g., at a network device, an aggregation group transmission credit quota for an aggregation group, where the aggregation group comprises a plurality of virtual links. At block 1210, the method 1200 includes assigning respective amounts of transmission credits of the aggregation group transmission credit quota to each virtual link of the aggregation group. The method also includes, at block 1215 receiving a data packet that is to be communicated using the aggregation group. At block 1220, the method 1200 includes determining a hash value based on the packet, such as by using the techniques described herein.

The method 1200 further includes, at block 1225, determining an assigned virtual link of the plurality of virtual links based on the hash value (e.g., using a flow set table and the techniques described above). The method 1200 also includes, at block 1230, reducing the aggregation group transmission credit quota by an amount proportional to the size of the packet and, at block 1235, reducing the respective amount of transmission credits assigned to the assigned virtual link by the amount proportional to the size of the packet. At block 1240, the method 1240 includes communicating the packet to another network device using the assigned virtual link.

In the method 1200, the plurality of virtual links may comprise a plurality of equal-cost-multiple-path (ECMP) links. Alternatively, the plurality of virtual links may comprise a plurality of weighted-cost paths. Further in the method 1200, the plurality of virtual links may correspond with a single physical link. Alternatively in the method 1200, the plurality of virtual links may be implemented using a link aggregation group (LAG) or a HiGig trunk, as two examples.

Further in the method 1200, reducing the number of available transmission credits for the aggregation group may comprise reducing the number of available transmission credits for the aggregation group by an amount proportional to the size of the packet (e.g., an observed size, as received, or the size of the packet after it has been encapsulated or decapsulated, depending on the specific implementation). Likewise, reducing the number of available transmission credits for the assigned virtual link comprises reducing the number of available transmission credits for the assigned virtual link by the amount proportional to the size of the packet (e.g., observed (received) size, or after encapsulation/decapsulation).

In another example embodiment, reducing the number of available transmission credits for the aggregation group at block 1230 may comprise reducing the number of available transmission credits for the aggregation group by one transmission credit, where each packet transmitted results in one transmission credit being deducted, regardless of the size of the packet. Further, in like fashion, in this example embodiment, reducing the number of available transmission credits for the assigned virtual link may comprise reducing the number of available transmission credits for the assigned virtual link by one transmission credit.

In the method 1200, reducing the number of available transmission credits for the aggregation group at block 1230 may comprise reducing the number of available transmission credits for the aggregation group prior to communicating the packet to the other network device. Likewise, reducing the number of available transmission credits for the assigned virtual link at block 1235 may comprise reducing the number of available transmission credits for the assigned virtual link prior to communicating the packet to the other network device.

In an example embodiment, a sum of the respective amounts of transmission credits that are assigned to the plurality of virtual links at block 1210 equals the assigned aggregation group transmission credit quota of block 1205. Using such an approach, the respective amounts of transmission credits assigned to each of the plurality of virtual links may be equal or may be weighted.

As indicated above, the amount of available transmission credits may be used a measure of member quality. The aggregate members for a give aggregation group may be grouped into quality bands based on their respective number of available transmission credits. Using such an approach, determining an assigned virtual link of the plurality of virtual links would be based on the respective amounts of available transmission credits for each of the plurality of virtual links (e.g., as represented by corresponding quality bands for the aggregate members based on their respective available transmission credits).

Figure 13:
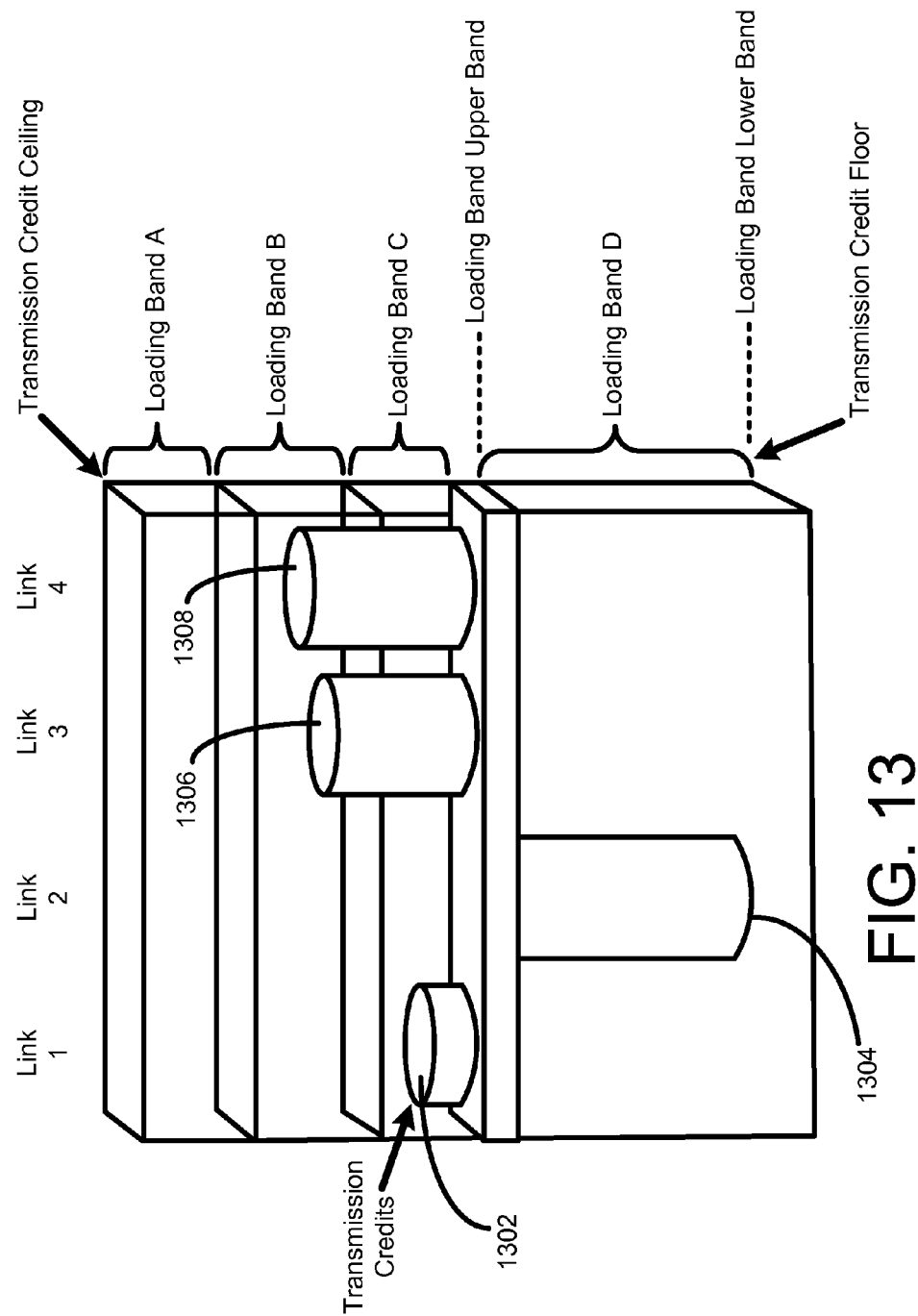
FIG. 13 is a diagram illustrating an embodiment of quality/loading bands in accordance with an example embodiment.

FIG. 13 is a diagram illustrating an embodiment of quality/loading bands in accordance with an example embodiment. In the diagram of FIG. 13, the quality/loading bands are based on a number of available transmission credits. As shown in FIG. 13, quality bands are displayed for four links Link 1-Link 4, which may be virtual links, for example. Alternatively, Link 1-Link 4 may comprise physical links.

The graph shown in FIG. 13 includes four contiguous, non-overlapping quality/loading bands A-D. The Loading Bands A-C (Upper Band) include aggregate members that have a surplus (available) transmission credits. The Loading Band D (Lower Band) includes aggregate members that have a deficit of transmission credits (negative transmission credit balances). As shown in FIG. 13, each aggregate member may only accumulate a surplus of transmission credits that is less than or equal to a transmission credit ceiling and, also, may not accumulate a deficit transmission balance that is less than a transmission credit floor.

In the graph shown in FIG. 13, the Loading Band A would include aggregate members having the highest member quality, while the Loading Band D would include aggregate members having the lowest member quality. The Link 1 in FIG. 13 has a surplus transmission credit balance 1302 and is a member of Loading Band C. The Link 2 has a deficit transmission credit balance 1304 and is a member of Loading Band D. The Links 3 and 4 in FIG. 3 have respective surplus transmission credit balances 1306 and 1308 and are both members of Loading Band B. In the graph shown in FIG. 13, Loading Band A does not have any eligible members. Thus, in an example embodiment, if an aggregate member assignment is made using the quality/loading bands shown in FIG. 13, it would be made from Loading Band B with a member selection vector '0011'. An assigned link may be determined from the member selection vector using number of techniques, such as the techniques discussed above.

Figure 14:
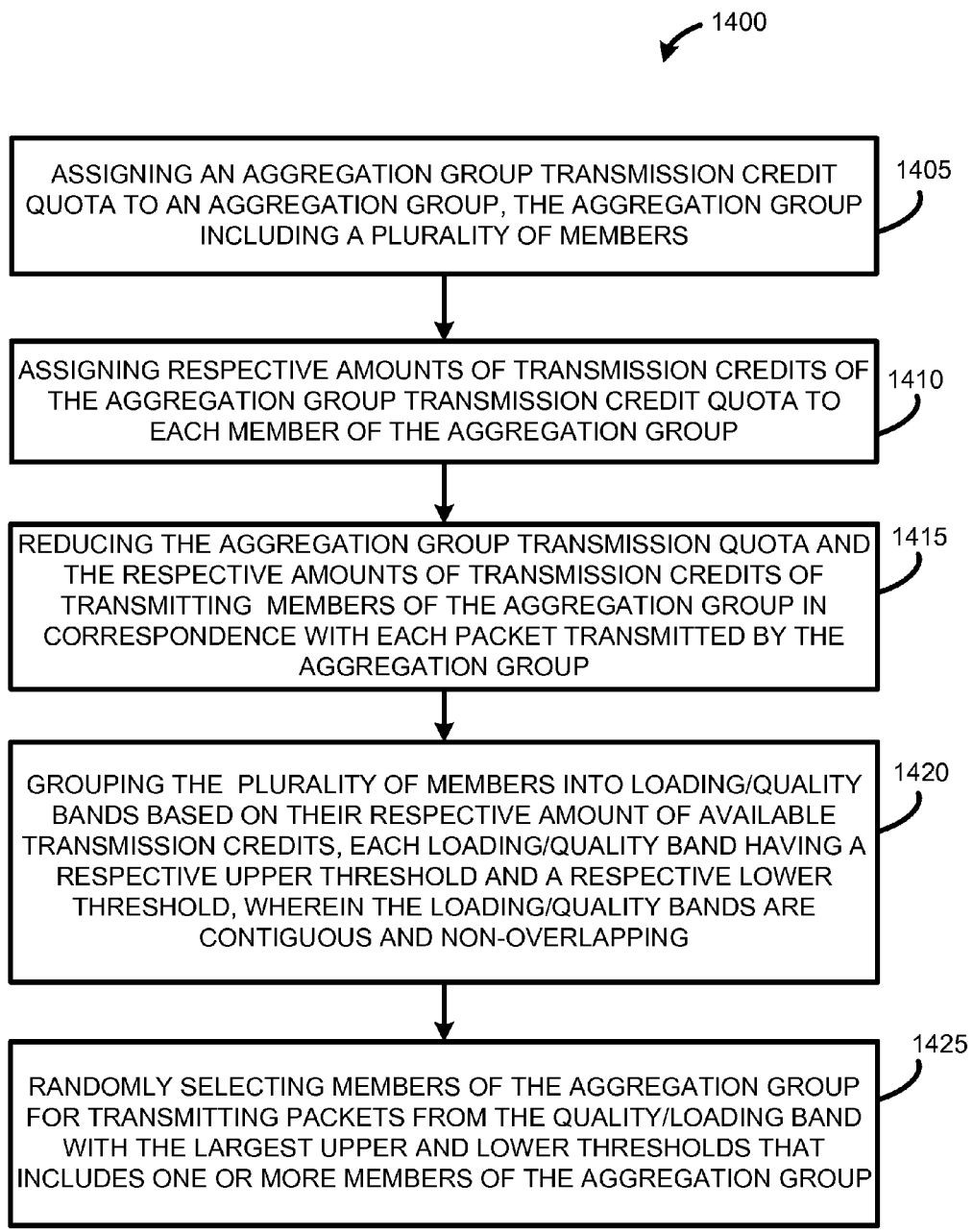
FIG. 14 is a flowchart illustrating a method for generating quality/loading bands for an aggregation group and selecting an aggregate member using the quality/loading bands in accordance with an example embodiment.

FIG. 14 is a flowchart illustrating a method 1400 for generating quality/loading bands for an aggregation group and selecting an aggregate member using the quality/loading bands in accordance with an example embodiment. The method 1400, at block 1405 includes assigning (e.g., at a network device) an aggregation group transmission credit quota to an aggregation group, the aggregation group including a plurality of members. The method 1400 further includes, at block 1410, assigning respective amounts of transmission credits of the aggregation group transmission credit quota to each member of the aggregation group. At block 1415, the method 1400 includes reducing the aggregation group transmission quota and the respective amounts of transmission credits of transmitting members of the aggregation group in correspondence with each packet transmitted by the aggregation group, such as using the techniques described herein.

At block 1420, the method 1400 includes grouping the plurality of members into loading/quality bands based on their respective amount of available transmission credits. In the method 1400, each loading/quality band may have a respective upper threshold and a respective lower threshold, and the loading/quality bands may be contiguous and non-overlapping. Further, the method 1400 includes, at block 1425, selecting members of the aggregation group for transmitting packets from the quality/loading band with the largest upper and lower thresholds that includes one or more members of the aggregation group, such as using the approach described above with respect to FIG. 13.

In the method 1400, reducing the aggregation group transmission quota and the respective amount of transmission credits of the transmitting member at block 1415 may comprise reducing the aggregation group transmission quota and the respective amount of transmission credits of the transmitting member by respective amounts of transmission credits corresponding with each transmitted packet. Alternatively, reducing the aggregation group transmission quota and the respective amount of transmission credits of the transmitting member at block 1415 of the method 1400 may comprise reducing the aggregation group transmission quota and the respective amount of transmission credits of the transmitting member by one transmission credit for each transmitted packet.

In the method 1400, reducing the aggregation group transmission quota and the respective amounts of transmission credits of transmitting members of the aggregation group at block 1415 may comprise reducing the aggregation group transmission quota and the respective amounts of transmission credits of transmitting members of the aggregation group upon transmission of each packet transmitted by the aggregation group. Alternatively, in the method 1400, reducing the aggregation group transmission quota and the respective amounts of transmission credits of transmitting members of the aggregation group at block 1415 may comprise reducing the aggregation group transmission quota and the respective amounts of transmission credits of transmitting members of the aggregation group prior to transmission of each packet transmitted by the aggregation group.

In the method 1400, the plurality of members may comprise a plurality of physical links. Alternatively, the plurality of members comprises a plurality of virtual links.

Figure 15:
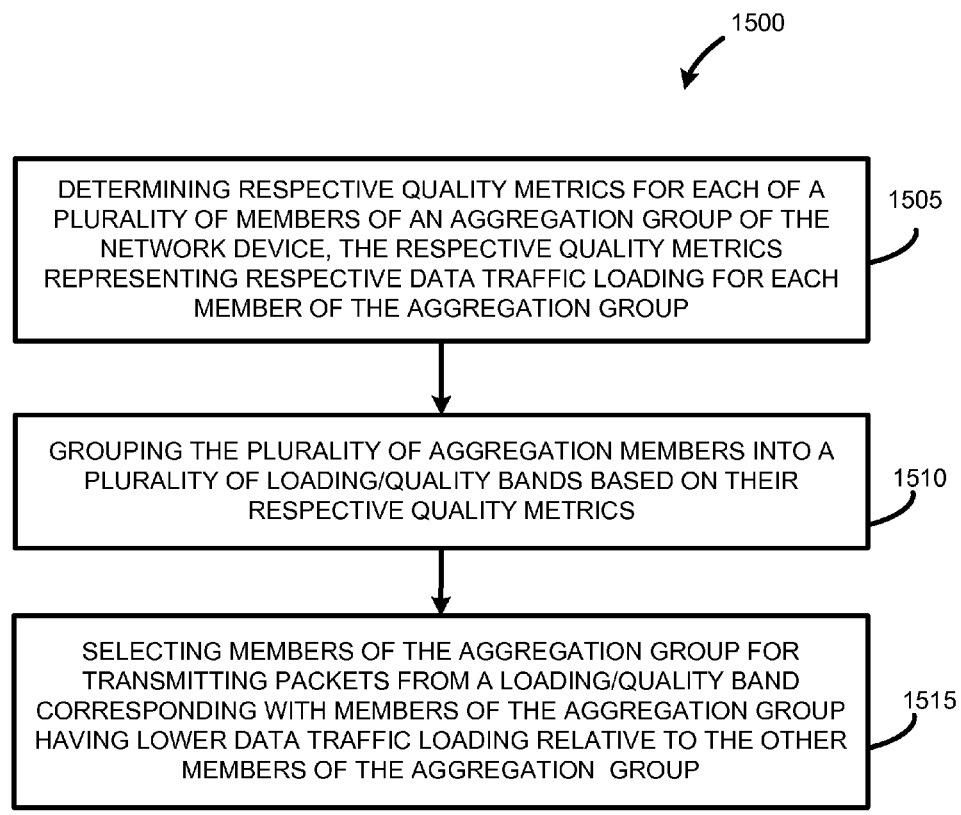
FIG. 15 is a flowchart illustrating a method for generating quality/loading bands for an aggregation group and selecting an aggregate member using the quality/loading bands in accordance with an example embodiment.

FIG. 15 is a flowchart illustrating a method 1500 for generating quality/loading bands for an aggregation group and selecting an aggregate member using the quality/loading bands in accordance with an example embodiment. The method 1500 includes, at block 1505, determining (e.g., by a network device) respective quality metrics for each of a plurality of members of an aggregation group of the network device. In the method 1500, the respective quality metrics may represent respective data traffic loading for each member of the aggregation group, such as described above with respect to FIGS. 5A-5C, for example.

The method 1500 may further include, at block 1510, grouping the plurality of aggregation members into a plurality of loading/quality bands based on their respective quality metrics, such as was illustrated in FIG. 6, for example. At block 1515, the method 1500 includes selecting members of the aggregation group for transmitting packets from a loading/quality band corresponding with members of the aggregation group having lower data traffic loading relative to the other members of the aggregation group, e.g., by selecting an aggregate member from a highest non-empty loading/quality band.

In the method 1500, the respective quality metrics may be based on at least one of port loading corresponding with each aggregate member and an amount of queued data corresponding with each aggregate member. For instance, each respective quality metric may be determined by combining a first quality metric corresponding with respective port loading and a second quality metric corresponding with the respective amount of queued data, such as was described above with respect to FIGS. 5A-5C. In other approaches, a number of available transmission credits may be used as a metric for determining link quality.

In the method 1500, selecting members of the aggregation group at block 1515 may comprise randomly selecting members of the aggregation group. Alternatively, selecting members of the aggregation group at block 1515 may comprise deterministically selecting members of the aggregation group, such as using round-robin selection, for example.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    receiving, at a network device, a data packet to be sent via an aggregation group, the aggregation group comprising a plurality of aggregate members;
    determining a flow set table index, including:
        determining a first offset based on an identifier for the aggregation group included in the packet; and
        generating a hash value from the packet,
    determining a flow identifier of a flow to which the data packet belongs, including:
        indexing, using the first offset as a first pointer, a portion of a flow set table corresponding with the aggregation group;
        indexing, using the hash value, a flow set table entry in the portion of the flow set table corresponding with the aggregation group, the flow set table entry including the flow identifier;
    determining a state of the flow;
    determining, based on the flow identifier and the state of the flow, an assigned member of the plurality of aggregate members for the flow; and
    communicating the packet via the assigned member.

2. The method of claim 1, wherein the plurality of aggregate members comprises a plurality of physical links.

3. The method of claim 1, wherein:
    determining the flow set table index further comprises:
        determining a priority of the packet; and
        determining a second offset based on the priority;
    determining the flow identifier further comprises indexing, using the second offset as a second pointer, a sub-portion of the portion of the flow set table corresponding with the aggregation group, the sub-portion corresponding with the determined priority; and
    the hash value is further used to index the flow set table entry in the sub-portion of the flow set table corresponding with the determined priority.

4. The method of claim 1, wherein determining the state of the flow comprises determining whether the state of the flow is one of:
    a new flow;
    an inactive flow; and
    an active flow.

5. The method claim 4, wherein, in the event the state of the flow is one of new and inactive, determining the assigned member comprises determining the assigned member based on respective quality measures for each of the plurality of aggregate members.

6. The method of claim 5, wherein the respective quality measures are determined based on respective data traffic loading and respective amounts of queued data for each of the plurality of aggregate members.

7. The method of claim 5, wherein determining the respective quality measure of a given aggregate member comprises:
    periodically measuring average data traffic loading for the given aggregate member;
    quantizing the average data traffic loading to a binary loading metric;
    periodically measuring average queued data for the given aggregate member;
    quantizing the average queued data to a binary queue size metric;
    combining the binary loading metric and the binary queue metric to produce a combined quality metric;
    mapping the combined quality metric to the respective quality measure using a quality mapping function.

8. The method of claim 7, wherein the quality mapping function is arbitrarily selected, by the network device, for the aggregation group from a plurality of quality mapping functions.

9. The method of claim 5, wherein determining the assigned member further comprises:
    grouping the respective quality measures into loading/quality bands, each loading/quality band having a respective upper threshold and a respective lower threshold, wherein the loading/quality bands are contiguous and non-overlapping; and
    randomly selecting the assigned member from a loading/quality band with largest upper and lower thresholds that includes one or more members of the aggregation group.

10. The method of claim 9, wherein randomly selecting the assigned member comprises:
    generating a random number;
    performing a binary search of a bit-map representing the members of the aggregation group included in the loading/quality band with the largest upper and lower thresholds that includes one or more members of the aggregation group, wherein the random number is used to select a direction for the binary search.

11. The method of claim 4, wherein determining the state of the flow is new comprises determining whether a flow set entry in the flow set table corresponding with the flow is valid, wherein if the flow set entry is not valid, the state of the flow is new.

12. The method of claim 4, wherein determining the state of the flow is inactive comprises determining a difference between a previous timestamp associated with the flow in the flow set table and a timestamp corresponding with the packet, wherein if the difference is greater than an inactivity duration, the flow is inactive.

13. The method of claim 12, wherein the inactivity duration is greater than a path skew associated with multiple paths of the aggregation group.

14. The method of claim 4, wherein determining the state of the flow is active comprises determining a difference between a previous timestamp associated with the flow in the flow set table and a timestamp corresponding with the packet, wherein if the difference is less than or equal to an inactivity duration, the flow is active.

15. The method of claim 4, wherein, in the event the state of the flow is active, determining the assigned member comprises determining the assigned member based on a previously assigned member for the flow.

16. A network device comprising:
- a data port configured to receive a data packet to be sent via an aggregation group of the network device, the aggregation group comprising a plurality of aggregate members;
- a flow identification module configured to determine, based on the data packet, a flow identifier of a flow to which the data packet belongs, wherein determining the flow identifier includes:
  - determining an offset based on an identifier for the aggregation group included in the packet; and
  - generating a hash value from the packet;
- a flow state module configured to determine a state of the flow;
- an aggregate member assignment module configured to determine, based on the flow identifier and the state of the flow, an assigned member of the plurality of aggregate members for communicating the data packet, wherein the flow identifier is used as an index for a flow set table included in the network device.

17. A method comprising:
- receiving, at a network device, a data packet to be sent via an aggregation group, the aggregation group comprising a plurality of aggregate members;
- determining, based on the packet, a flow identifier (ID) for a data flow corresponding with the packet, wherein determining the flow identifier includes:
  - determining a first offset based on an identifier for the aggregation group included in the packet; and
  - generating a hash value from the packet;
- indexing a flow set table using the flow ID;
- determining a state of the data flow;
- determining, based on the flow ID and the state of the flow, an assigned member of the plurality of aggregate members for the data flow; and
- communicating the packet via the assigned member.

18. The method of claim 17, wherein determining the flow set identifier further comprises:
- determining a priority of the packet;
- determining a second offset based on the priority, wherein:
- the first offset is used as a pointer for indexing a portion of the flow set table corresponding with the aggregation group;
- the second offset is used as pointer for indexing a sub-portion of the flow set table corresponding with the aggregation group, the sub-portion corresponding with the determined priority, and
- the hash value is used to index a flow set table entry in the sub-portion of the table corresponding with the aggregation group and the determined priority.

\* \* \* \* \*

UNITED STATES PATENT AND TRADEMARK OFFICE
CERTIFICATE OF CORRECTION

PATENT NO. : 8,355,328 B2
APPLICATION NO. : 12/780493
DATED : January 15, 2013
INVENTOR(S) : Brad Matthews et al.

It is certified that error appears in the above-identified patent and that said Letters Patent is hereby corrected as shown below:

In column 20, line 1, In Claim 5, after "method" insert -- of --.

In column 22, line 14, In Claim 18, delete "set identifier" and insert -- identifier --, therefor.

Signed and Sealed this
Ninth Day of April, 2013

Teresa Stanek Rea
*Acting Director of the United States Patent and Trademark Office*